United States Patent
Ramakrishna et al.

(10) Patent No.: US 12,332,794 B2
(45) Date of Patent: Jun. 17, 2025

(54) CACHE COHERENCE USING ADAPTIVE COHERENCY TRACKING BASED ON CACHELINE SIZE AND CACHELINE SECTOR SIZE

(71) Applicant: Microsoft Technology Licensing, LLC, Redmond, WA (US)

(72) Inventors: Mukund Ramakrishna, Austin, TX (US); Dimitrios Kaseridis, Austin, TX (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 18/336,637

(22) Filed: Jun. 16, 2023

(65) Prior Publication Data

US 2024/0419593 A1  Dec. 19, 2024

(51) Int. Cl.
*G06F 12/0817* (2016.01)

(52) U.S. Cl.
CPC ...... *G06F 12/0817* (2013.01); *G06F 2212/62* (2013.01)

(58) Field of Classification Search
CPC ............... G06F 12/0817–0828; G06F 2212/62
See application file for complete search history.

(56) References Cited

U.S. PATENT DOCUMENTS

| | | | |
|---|---|---|---|
| 6,631,447 B1 * | 10/2003 | Morioka | G06F 12/0826 711/124 |
| 9,223,711 B2 | 12/2015 | Philip | |
| 10,592,424 B2 | 3/2020 | Beard | |
| 10,657,055 B1 | 5/2020 | Jalal | |
| 11,550,720 B2 | 1/2023 | Ramagiri | |
| 2002/0124144 A1 | 9/2002 | Gharachorloo | |
| 2008/0147988 A1 | 6/2008 | Heller et al. | |
| 2008/0209133 A1 | 8/2008 | Ozer | |
| 2014/0052905 A1 | 2/2014 | Lih | |
| 2015/0012719 A1 | 1/2015 | Tune | |
| 2016/0062890 A1 | 3/2016 | Salisbury | |
| 2016/0062893 A1 | 3/2016 | Tune | |
| 2016/0117249 A1 | 4/2016 | Lin | |
| 2017/0255557 A1 | 9/2017 | Robinson | |
| 2017/0286299 A1 | 10/2017 | Sury | |

(Continued)

FOREIGN PATENT DOCUMENTS

WO  2017155659 A1  9/2017

OTHER PUBLICATIONS

A. Moshovos, "RegionScout: Exploiting Coarse Grain Sharing in Snoop-Based Coherence", 32nd International Symposium on Computer Architecture (ISCA'05)—IEEE, Jun. 4, 2005, pp. 234-245.

(Continued)

*Primary Examiner* — Chie Yew
(74) *Attorney, Agent, or Firm* — Holzer Patel Drennan

(57) ABSTRACT

The described technology provides a method including determining a cacheline sector associated with a snoop filter (SFT) having a plurality of SFT entries, determining a number of cachelines in the identified cacheline sector that are cached by one or more agents, and determining, based on the number of cachelines in the identified cacheline sector that are cached by one or more agents, a number of bits in a bit vector (BV) of one or more of the plurality of SFT entries, wherein the number of bits is required to track the one or more agents.

12 Claims, 5 Drawing Sheets

(56) References Cited

U.S. PATENT DOCUMENTS

| | | |
|---|---|---|
| 2019/0073304 A1 | 3/2019 | Jiang |
| 2020/0042446 A1 | 2/2020 | Mittal |
| 2020/0218657 A1 | 7/2020 | Forrest |
| 2020/0250098 A1 | 8/2020 | Ma |
| 2021/0294743 A1 | 9/2021 | Randall |
| 2022/0100672 A1* | 3/2022 | Apte .................. G06F 12/0826 |
| 2022/0164288 A1 | 5/2022 | Ramagiri |
| 2022/0308999 A1 | 9/2022 | Randall |
| 2023/0100746 A1 | 3/2023 | Loison |
| 2023/0139212 A1 | 5/2023 | Randall |
| 2024/0403218 A1 | 12/2024 | Robinson |
| 2024/0403219 A1 | 12/2024 | Kaseridis |
| 2024/0419594 A1 | 12/2024 | Panavich |
| 2024/0427703 A1 | 12/2024 | Robinson |

OTHER PUBLICATIONS

Ehsan Atoofian, "Adaptive Snoop Granularity and Transactional Snoop Filtering in Hardware Transactional Memory", Canadian Journal of Electrical and Computer Engineering—IEEE, vol. 37, Issue 2, 2014, pp. 76-85.

International Search Report and Written Opinion received for PCT Application No. PCT/US2024/029558, Aug. 30, 2024, 15 pages.

International Search Report and Written Opinion received for PCT Application No. PCT/US2024/030161, Jul. 24, 2024, 12 pages.

Moshovos, et al., "JETTY: filtering snoops for reduced energy consumption in SMP servers", Proceedings HPCA Seventh International Symposium on High-Performance Computer Architecture—IEEE, Jan. 19, 2001, pp. 85-96.

Non-Final Office Action mailed on Jul. 8, 2024, in U.S. Appl. No. 18/326,147, 12 pages.

Non-Final Office Action mailed on Jun. 10, 2024, in U.S. Appl. No. 18/325,863, 13 pages.

Notice of Allowance mailed on Aug. 27, 2024, in U.S. Appl. No. 18/340,359, 08 pages.

Zebchuk, et al., "Multi-grain coherence directories", MICRO-46: Proceedings of the 46th Annual IEEE/ACM International Symposium on Microarchitecture, Dec. 7, 2013, pp. 359-370.

Final Office Action mailed on Dec. 11, 2024, in U.S. Appl. No. 18/325,863, 13 pages.

International Search Report and Written Opinion received for PCT Application No. PCT/US2024/033323, Oct. 11, 2024, 11 pages.

International Search Report and Written Opinion received for PCT Application No. PCT/US2024/033480, Sep. 10, 2024, 15 pages.

International Search Report and Written Opinion received for PCT Application No. PCT/US2024/034880, Oct. 14, 2024, 14 pages.

Notice of Allowance mailed on Dec. 5, 2024, in U.S. Appl. No. 18/340,359, 2 pages.

Notice of Allowance mailed on Oct. 23, 2024, in U.S. Appl. No. 18/326,147, 9 pages.

U.S. Appl. No. 18/325,863, filed May 30, 2023.

U.S. Appl. No. 18/340,359, filed Jun. 23, 2023.

U.S. Appl. No. 18/326,147, filed May 31, 2023.

U.S. Appl. No. 18/336,694, filed Jun. 16, 2023.

Notice of Allowance mailed on Feb. 13, 2025, in U.S. Appl. No. 18/340,359, 05 pages.

Non-Final Office Action mailed on Feb. 13, 2025, in U.S. Appl. No. 18/336,694, 27 pages.

Notice of Allowance mailed on Feb. 10, 2025, in U.S. Appl. No. 18/326,147, 05 pages.

Notice of Allowance mailed on Apr. 28, 2025, in U.S. Appl. No. 18/325,863, 8 pages.

\* cited by examiner

CACHE COHERENCE USING ADAPTIVE COHERENCY TRACKING BASED ON CACHELINE SIZE AND CACHELINE SECTOR SIZE

BACKGROUND

A processor-based device may include multiple processing elements (PEs) (e.g., processor cores, as a non-limiting example) that each provide one or more local caches for storing frequently accessed data. Because the multiple PEs of the processor-based device may share a memory resource such as a system memory, multiple copies of shared data read from a given memory address may exist at the same time within the system memory and within the local caches of the PEs. Thus, to ensure that all of the PEs have a consistent view of the shared data, the processor-based device provides support for a cache coherence protocol to enable local changes to the shared data within one PE to be propagated to other PEs.

SUMMARY

The described technology provides a method including determining a cacheline sector associated with a snoop filter (SFT) having a plurality of SFT entries, determining a number of cachelines in the identified cacheline sector that are cached by one or more agents, and determining, based on the number of cachelines in the identified cacheline sector that are cached by one or more agents, a number of bits in a bit vector (BV) of one or more of the plurality of SFT entries, wherein the number of bits is required to track the one or more agents.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

FIG. 1 illustrates an example implementation of a system providing cache coherence using snoop filters.

FIG. 2 discloses example operations of the cache coherence system disclosed herein for updating an SFT entry field for an allocating request.

FIG. 3 discloses example operations of the cache coherence system disclosed herein for updating an SFT entry field for an invalidating request.

DETAILED DESCRIPTIONS

Figure 1:
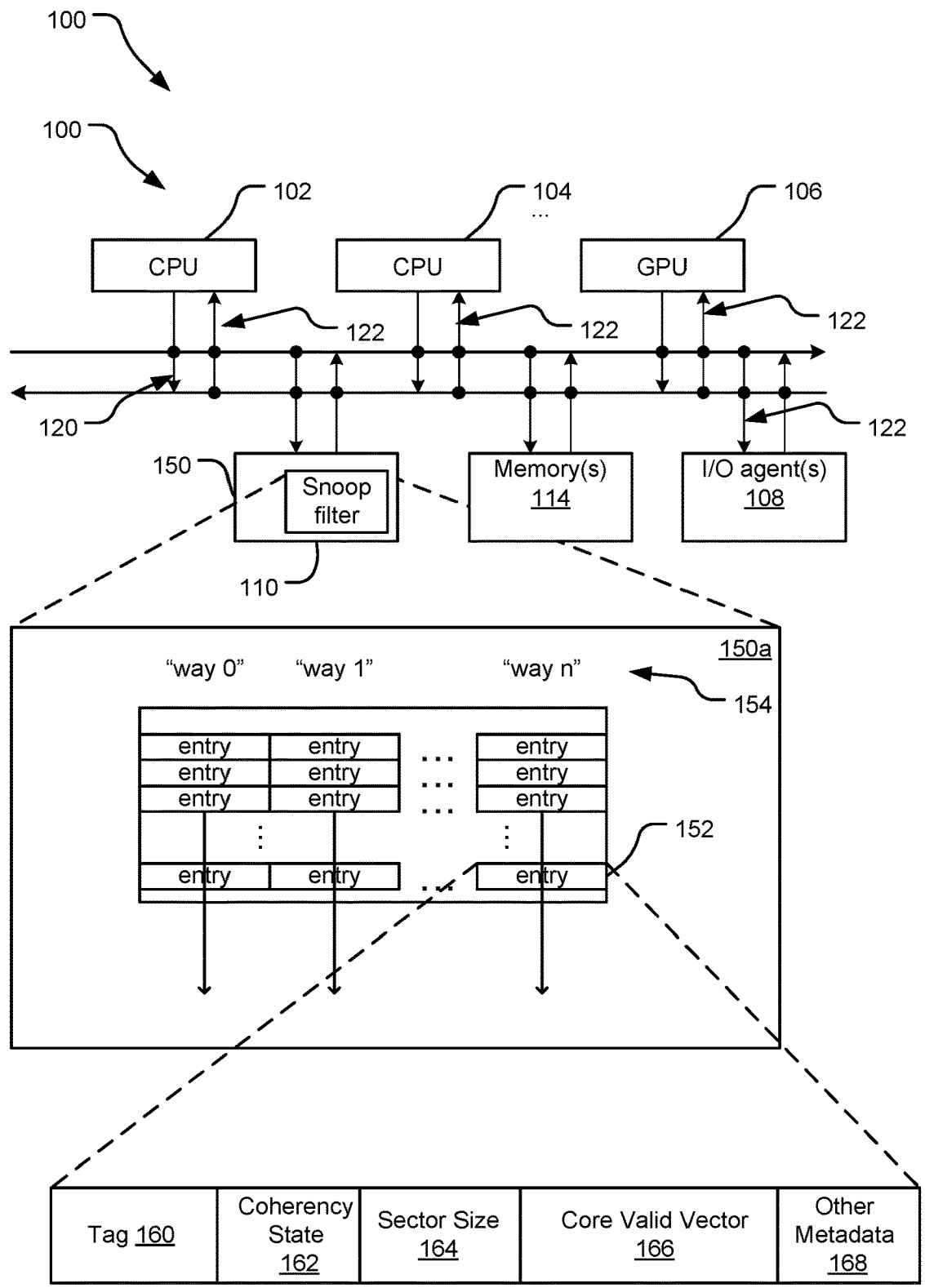

Implementations disclosed herein disclose multi-processor systems that employ hardware (HW)-enforced cache coherency in which when an agent, such as a CPU, a GPU, etc., wants to access a memory location, HW automatically determines whether another agent currently holds a copy of that memory location. If the access is a read and the memory location is cached by another agent, system memory might be stale, in which case the access must be satisfied by obtaining the data from the other agent's cache. If the access is a write, typically other cached copies must be first written back to system memory. The memory block for which HW-enforced cache coherency is maintained is called a coherence granule (cogran) and system may match its cogran size to the cache line size.

In order to ensure program correctness, multi core systems on chip (SoCs) have to be designed with micro-architectural features to correctly order and manage accesses to the same physical memory address space from different cores. Due to the existence of private caches in today's architectures, the coherency protocol has the responsibility to track which cores have a particular address cached privately and manage its visibility to other cores in the system. The simplest mechanism to perform coherency involves sending snoop messages to all other agents in the system which *may* cache the line. As the number of agents has grown over time, most modern architectures use a tracking structure called a snoop filter which tracks which lines are resident in which private cache. This provides a filtered way of the topology and reduces the amount of required snooping.

Cache coherency is a fundamental property of multi-core architectures which requires concurrently executing threads to be presented with a consistent and coherent view of the memory address space. Modern multi-core architectures dedicate significant amounts of hardware and design resources in ensuring that the chip has coherent domains where dedicated pipelines and flows work in the background to ensure coherency. From a performance perspective, these activities should have a minimal impact on regular execution of the performance. As designs scale to an ever-increasing number of cores, the overhead of maintaining coherence has grown significantly as well.

One of the architectural features that helps solve the problem of scale is a snoop filter (SFT). This dedicated hardware structure provides an up to date view of the cachelines resident in private caches on agent CPUs so that coherency operations are carried out as necessary, thereby reducing the pressure on the system of chip (SoC) resources-specifically on-chip bandwidth and cache pipeline bandwidth, which otherwise may be used to send and process snoop requests.

To be effective, an SFT may be required to precisely track the upstream cache contents. This, in turn, requires sufficient provisioning in terms of the area reserved for the SFT as any entry that cannot be tracked by the snoop filter has to be invalidated from the private cache as well which can be detrimental to performance. In an ideal world, the snoop filter needs to provide at least 1× coverage of the size of the private cache. In area terms, as the SFT only holds tags, it needs to have an entry for each valid cacheline in the private cache. Therefore, number of SFT entries (N) for 1× coverage=L2 size (B)/L2 line size (B), and area of SFT=area per SFT entry×N.

Therefore, for an L2 cache of 256 Kbytes with L2 cacheline size is 64 bytes would require 4K SFT entries for just one agent CPU. This SFT area requirement is further exacerbated by set associative nature of private caches and by the large number of agents on SoCs. One method implemented to solve this area constraint is coarse grained tracking of cache lines in the SFT. In effect, if the SFT tracks n cachelines per entry then the area requirement for the same amount of coverage is now 1/n. This approach may require the workload needs to access all n cachelines of the same sector close together in time. In some implementations, the n cachelines that are clubbed into the same entry are spatially co-located as well. However, in such implementations, if the locality rules are not adhered to by a particular workload, then the sectoring approach comes with a significant performance penalty of over-snooping. To mitigate the oversnooping, implementations of SFT may include metadata to each coarse entry.

The cache coherence system disclosed herein illustrates a mechanism to track cacheline ownership for coarse grained snoop-filters that allows a flexible usage of the core valid (CV) vector bits to be able to tradeoff with sector size. Specifically, the cache coherence system disclosed herein requires a smaller number of bits to track individual agents when the amount of sharing of a cacheline is below a threshold to derive maximum area savings using coarse grained aggregation. On the other hand, when the amount of sharing a cacheline increases above a threshold, the cache coherence system limits the sector size of the snoop filter and dedicates more bits to track the individual agents. Implementations disclosed herein applies this solution to a static coarse grained snoop filter. An alternative implementation disclosed herein applies this solution to a dynamic snoop filter where different sector sizes are allowed to co-exist at runtime.

FIG. 1 illustrates an implementation of a system 100 providing cache coherence using snoop filters in accordance with the technology disclosed herein. Specifically, the cache coherence system 100 may be implemented on a multi-core architecture that includes a number of central processing unit (CPU) cores, 102 and 104, a graphical processing unit (GPU) 106, one or more input/output (I/O) agents 108, a point of serialization (POS) 110, and a memory 114. Although the present example shows two CPU cores and one GPU, it is understood that any number of CPU cores and CPUs can be used without deviating from the scope of the present disclosure. Examples of the I/O agents 108 include, but are not limited to, Industry Standard Architecture (ISA) devices, Peripheral Component Interconnect (PCI) devices, PCI-X devices, PCI Express devices, Universal Serial Bus (USB) devices, Advanced Technology Attachment (ATA) devices, Small Computer System Interface (SCSI) devices, and InfiniBand devices.

The processing unit cores 102, 104, 106, and the I/O agents 108 may be referred to as agents 102-108, each referenced by agent IDs (AIDs). These agents 102-108 may have multiple levels of internal caches such as L1, L2, and L3 caches. As the agents 102-108 cache coherent and shared memory blocks (cograns) in their internal caches, a snoop filter (SFT) 150 may keep track of a record and location of these cograns. Any of the agents 102-108 may issue coherent or non-coherent requests and the POS 110 ensures the serialization of the memory access requests using the snoop filter 150 to provide memory coherency.

For example, the PoS 110 receives a coherent request 120 from a CPU 102. In response to the coherent request 120, the POS 110 issues a snoop command 122 to the CPU cores 104, the GPU 106, and the I/O agents 108. The CPU cores 104, the GPU 106, and the I/O agents 108 may provide the requested coherent information back to the POS 110. When sending the snoop 122, the POS 110 refers to the SFT 150.

An example implementation of the SFT 150 is illustrated by SFT 150a. The SFT 150a includes a data structure to track the location of cograns that are currently cached in by agents 102-108. The SFT 150a may be an n-way filter as indicated by n-arrays 154. The snoop filter 150a may include an array of entries 152, the content of the entries 152 is further described below. In an implementation of the SFT 150a disclosed herein, a logical entry 152 may be configured to store a Tag field 160, coherency state 162, sector size (164), core valid (CV) vector 166, and other metadata 168 including, among other metadata, an error correction code (ECC).

The Tag field 160 is used to store a tag portion of physical address (PA) that identifies a cogran. For example, for cogran size of 64 bytes, and SFT being a 16-way associative SFT, bits 15:6 of the PA may be used to select an SFT set and bits 47:16 of the PA may be stored as the tag in the Tag field 160 of the SFT entries 152. When the SFT 150a needs to perform a lookup to see if a cogran's PA is present in the SFT 150a, it selects one of the 16 sets using PA [15:6]. Subsequently, for the selected set, the SFT 150a may compare the PA [47:16] against the tag values stored in the Tag field 160 of the 16 SFT entries 152 in the selected set. If the Tag field 160 of any of the 16 SFT entries in the selected set finds a match, then its way (e.g., way 5) is currently tracking the cogran being looked up.

The coherency state 162 tracks whether the cacheline being tracked by an SFT entry is exclusively owned by one agent or is it owned by more than one agents. The sector size 164 is determined by the number of cachelines being tracked by the SFT entry. The CV vector 166 tracks agent IDS (AIDs) of the agents that hold the cacheline. Using the CV vector 166 reduces over-snooping as the coherence enforcement requires snooping only the agents that are tracked by the CV vector 166 instead of snooping all vectors regarding their potential holding the cacheline. The other metadata 168 may include fields identifying reuse information and other information that may be used for SFT performance enhancement.

The implementations of the cache coherence system 100 disclosed herein uses the allocated bits of the CV vector 166 to track the actual cachelines within the sector that are being stored in private caches of agents and the CV vector 166. In the illustrated implementation, when the amount of sharing of the cachelines is low, smaller number of bits are required to track cores or agents and the cache coherence system 100 the CV vector 166 to track individual cores or agents to derive area saving using coarse grained aggregation. On the other hand, when the sharing of the cachelines tracked by the SFT entry increases, the cache coherence system 100 limits the sector size of the SFT 150a and dedicates more bits in the CV vector 166 to track individual cores or agents.

The following figures describe in detail the interchange between the two states for the SFT entries, specifically between a static coarse-grained structure of the SFT entry when the sharing of cachelines is low and a dynamic structure where different sector sizes 164 are allowed to co-exist at runtime. Specifically, the implementations disclosed below describe flexibly allocating bits of the CV vector 166 to (a) track the actual cachelines in the sector that are being stored in private caches, (CV vector 166 indicating a sector valid), and (b) track cores or agents that hold the cachelines (CV vector 166 as CV vector).

The implementations disclosed herein adaptively uses the CV vector bits based on the sector size of SFT. If the sector size is small, for example 128B, the concurrent sharing of the cachelines of the sectors is generally restricted to a subset of cores. For example, for a 64-core system, 6 bits are required to uniquely identify the cores. In this case, if the whole sector is being held by only a single core, the CV vector 166 can be only 6 bits instead of the standard 64 bits. Given that the generally CV vectors 166 are provisioned to have 64 bits, the cache coherence system 100 calculates the number of cores that can be tracked within the CV vector 166 to achieve area savings using coarse grained snoop filter tracking scheme.

Given a baseline SFT CV vector 166 implementation of 'T' bits, the below formula is an estimate of the core-tracking capabilities of this scheme. The value of T is determined by the number of cores/agents being tracked in the coherency domain and 'N' denotes the number of agents that the scheme can track.

$$\text{Core ID fields} = \log_2(\text{num\_cores}) * N$$

$$\text{Bit vector fields} = (\text{sector\_size}/\text{cacheline\_size}) * N$$

$$N = \text{Floor}(T/(\log_2(\text{num\_cores}) + (\text{sector\_size}/\text{cacheline\_size})))$$

The following table gives the number of cores that can be tracked assuming CV Vector 166 size T being 64 bits and cacheline size of 64 Bytes.

| Sector Size Bytes | Cacheline Size Bytes | Sector/ CL | T (CV size) Bits | Cores (Agents) | Log2 (Cores) Bits req'd | N |
|---|---|---|---|---|---|---|
| 128 | 64 | 2 | 64 | 64 | 6 | 8 |
| 256 | 64 | 4 | 64 | 64 | 6 | 6 |
| 512 | 64 | 8 | 64 | 64 | 6 | 4 |
| 1024 | 64 | 16 | 64 | 64 | 6 | 2 |

In an implementation of the cache coherence system disclosed herein, each SFT entry can track N cores using N CoreID fields, for example, $\text{CoreID}_0$, $\text{CoreID}_1$, .... $\text{CoreID}_{N-1}$. Here each CoreID field holds an encoded CoreID and has an associated BV field, such as $BV_0$, $BV_1$, .... $BV_{N-1}$, etc. The BV fields hold information about the cograns of a sector that are cached by the CoreID it is associated with. Thus, if the size of the sector of the SFT architecture is larger the associated BV field is larger.

In an implementation using the dynamic sector size of an SFT, the above estimate of N, the number of agents that can be tracked using the CV vector 166, can be modified using the bits "S" required to represent the current sector size, denoted by sector size 164. Specifically, with such dynamic sector size implementation the below formula provides an estimate of N:

$$N = \text{Floor}(((T-S)/(\log_2(\text{num\_cores}) + (\text{sector\_size}/\text{cacheline\_size})))$$

The following table gives the number of cores that can be tracked assuming CV Vector 166 size T being 64 bits and cacheline size of 64 Bytes. In this implementation, the sector size may be dynamically selected based on N, the number of agents that can be tracked using the CV vector 166. For example, if the current sector size of the NFT architecture is 1024 bytes and if it is necessary that N, the number of agents that can be tracked needs to higher than two (2), the cache coherence system may dynamically select the sector size to 512 bytes. Alternatively, if the cache coherence system determines that the sharing of the cachelines is low as indicted by the required number of agents to be tracked by the SFT compared to N, it may dynamically increase the sector size. Thus, for example, if the required number of agents to be tracked by the SFT is three (3) and the current value of N is six (6), the cache coherence system may dynamically increase the sector size to 512 bytes from 256 bytes.

| Sector Size Bytes | Cacheline Size Bytes | Sector/ CL | T (CV size) Bits | Cores (Agents) | Log2 (Cores) Bits req'd | S | N |
|---|---|---|---|---|---|---|---|
| 128 | 64 | 2 | 64 | 64 | 6 | 1 | 7 |
| 256 | 64 | 4 | 64 | 64 | 6 | 2 | 6 |
| 512 | 64 | 8 | 64 | 64 | 6 | 2 | 4 |
| 1024 | 64 | 16 | 64 | 64 | 6 | 3 | 2 |

The implementation using the dynamic sector size of an SFT trades off sector size for greater tracking capability without any increase in the required bits in the SFT entry. The key capability of this implementation is the fact that based on the cacheline sharing scope, the sector size can be degraded or upgraded in order to maintain the correct CV vector 166 usage.

Figure 2:
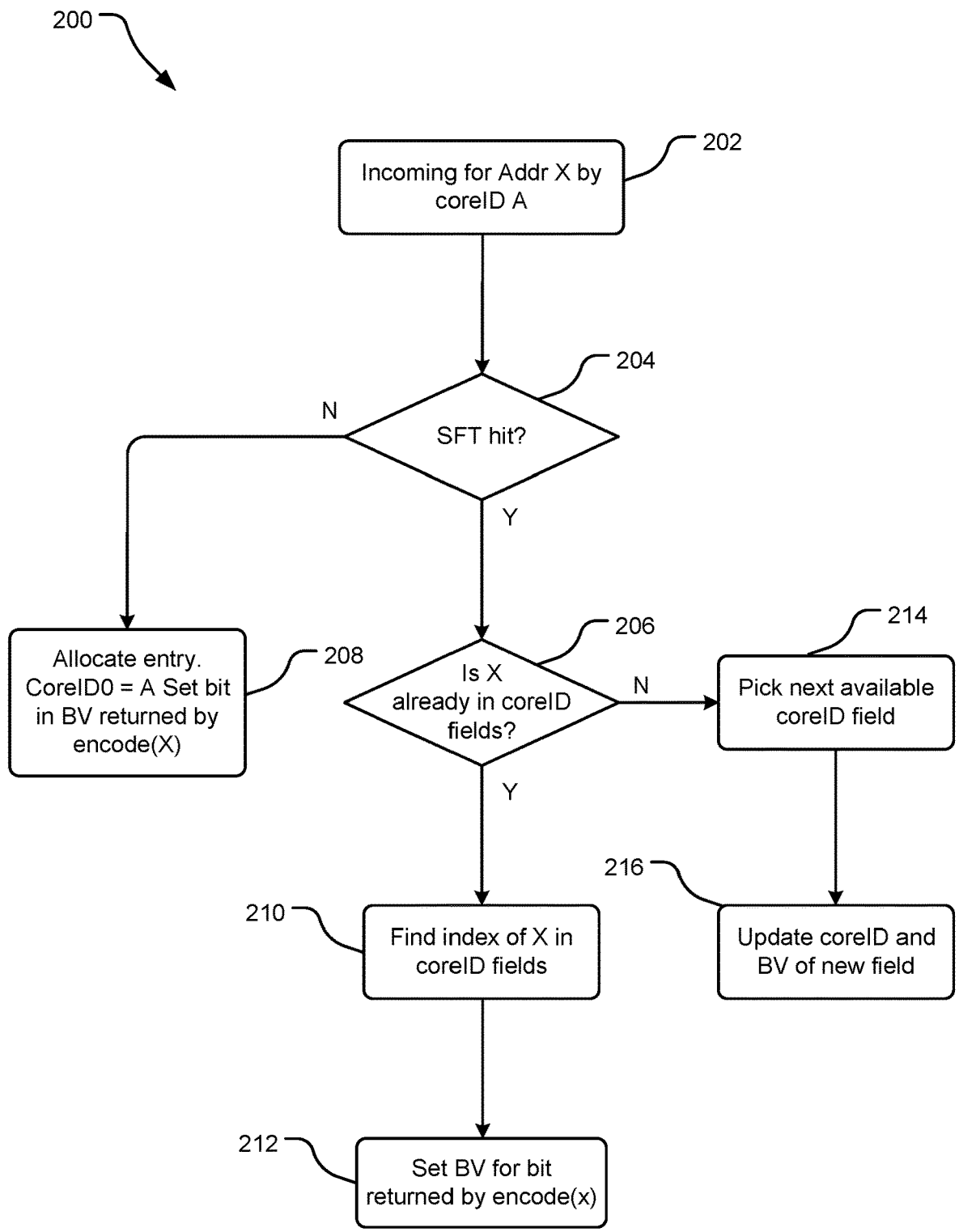

FIG. 2 discloses operations 200 of the cache coherence system disclosed herein for updating an SFT entry field for an allocating request. An operation 202 may receive an incoming request for allocating an SFT entry for a cacheline at address X by a new caching agent having a coreID A or agent ID (AID) A. An operation 204 determines if there is an existing SFT entry that tracks the cacheline at address X. If not, an operation 208 allocates a new SFT entry and sets the coreID of the newly allocated entry to the coreID A and sets the bit of the bit vector (BV) in the SFT entry as indicated by an encode(x) function of the cache coherence system. The encode(x) function is used to derive a bit of the BV to be set or reset according to the address of the cacheline and its relative position in the sector. Specifically, the encode(x) function is an encoding function for a BV used by a coarse grained SFT. The encode(x) may return a bit to be set/reset in the BV for this CoreID, CoreID (0), and a BV based with a bit set according to where the cacheline X lies within the sector.

If there is an SFT hit at operation 204 indicating an existing SFT entry that tracks the cacheline at address X, an operation 206 determines if this particular coreID A already exists in the coreID field of the SFT entry that was hit. This may be the case when the same core, core A has now accessed a different cacheline within the same sector that is being tracked by the hit SFT entry. If so, an operation 210 finds an index of the cacheline X in the coreID fields of the hit SFT entry. Subsequently, an operation 212 calls encode (x) function to set appropriate value of a bit in the BV.

If operation 206 determines that the core A is accessing the sector having the cacheline X for the first time, an operation 214 picks a next available coreID field in the SFT entry. Subsequently, an operation 216 updates the coreID of the next available coreID field and calls the encode(x) function to set appropriate bit in the BV associated with the SFT entry. The operations 200 provides information about all coreIDs that have accessed a sector as well as about which cachelines within a given sector are being cached by which coreID. This is a technical advantage provided by the current solution over other implementations of coarse-grained SFT implementations that provide information only about all the coreIDs that have accessed the sector tracked by the SFT entry but does not provide information about which cachelines within a given sector are being cached by which coreID. In addition, the technology disclosed herein allows providing such information without any increase in the required area of the SFT.

Figure 3:
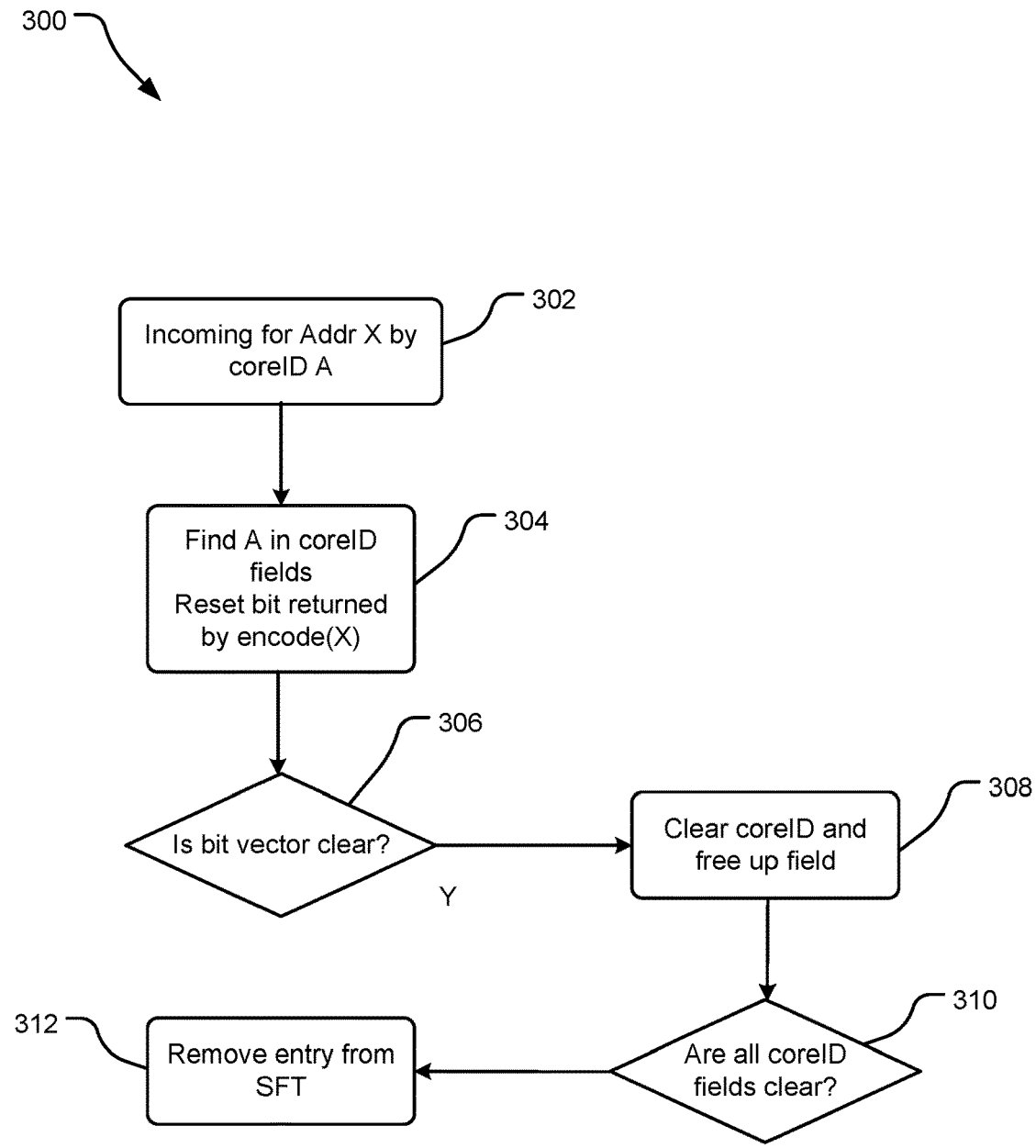

FIG. 3 discloses operations 300 of the cache coherence system disclosed herein for updating an SFT entry field for an invalidating request. Specifically, the operations 300 are used when a caching coreID is giving up a cacheline. An operation 302 may receive an incoming request for invalidating an SFT entry for a cacheline at address X by an agent having a coreID A. An operation 304 finds the coreID A in coreID field of an SFT entry as well as identifies the bit in the related BV that needs to reset by calling the encode(x) function.

Subsequently an operation 306 determines if the entire BV is clear. If so, an operation 308 clears the coreID field from the SFT entry so that the coreID field may be used by another core/agent. Further, an operation 310 determines if all coreID fields of the hit SFT entry are clear. If so, an operation 312 removes the SFT entry from the SFT.

Figure 4:
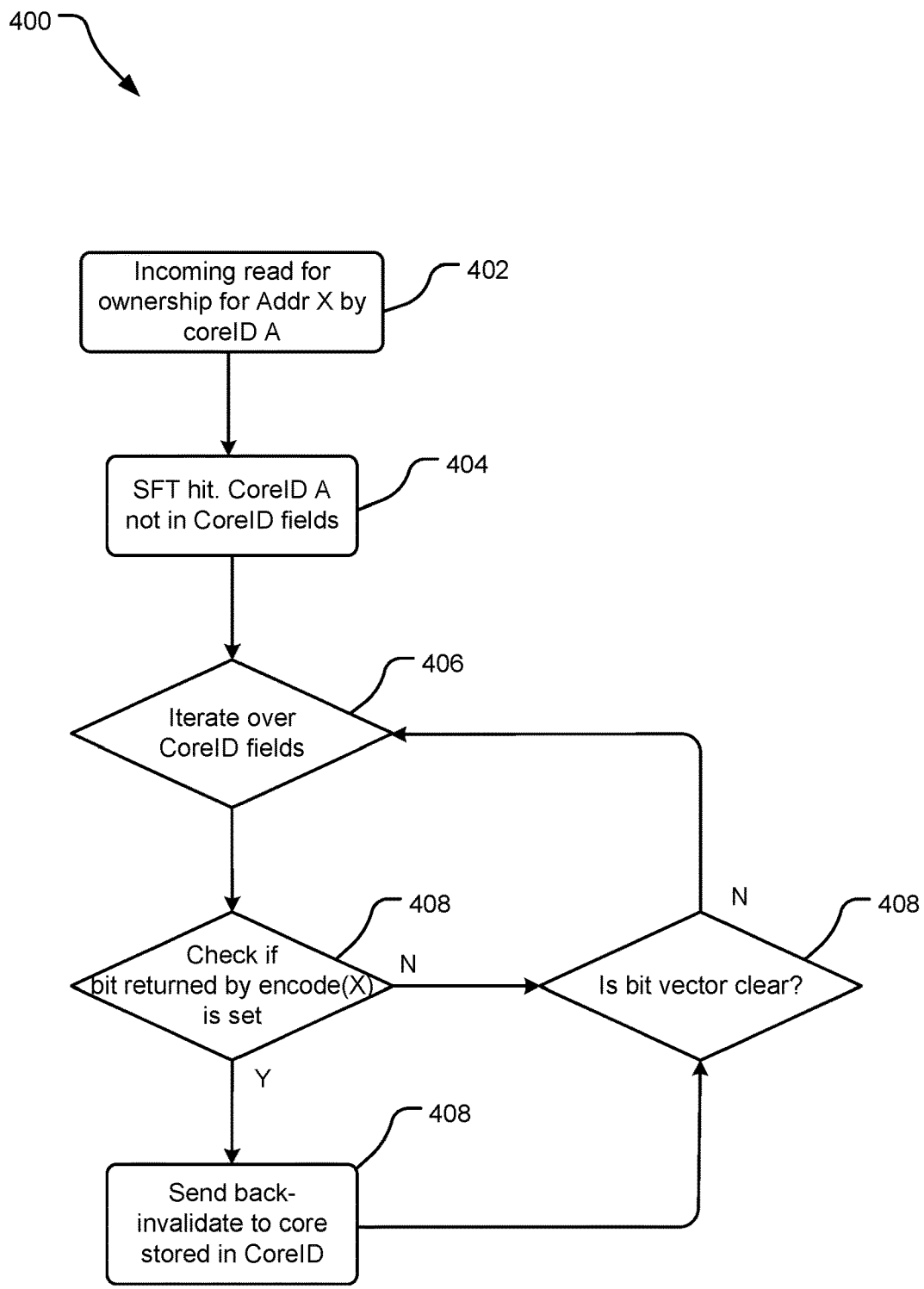
FIG. 4 illustrates example operations of the cache coherence system disclosed herein for taking over ownership of a shared cacheline.

FIG. 4 illustrates operations 400 of the cache coherence system disclosed herein for taking over ownership of a shared cacheline. Specifically, the operations 400 show an example snoop generating scenario generated by a request for ownership operation by an agent to obtain exclusive ownership of a cacheline. An operation 402 receives an incoming ownership request for reading a cacheline at address X by an agent having coreID A.

An operation 404 determines that the hit SFT entry does not include the coreID A in its coreID field. Subsequently, an operation 406 iterates over the existing coreID fields in the hit SFT entry to determine if the address X is cached any of the existing caching agents identified by coreID fields of the hit SFT entry. Specifically, for each coreID field, an operation 408 determines if the BV bit returned by encode(x) function for that coreID for the cacheline at X is set. If so, an operation 408 sends a single snoop or back-invalidate requests to that particular core at that stage of iteration. No more snoop or back-invalidate requests are required to any other cores. The back invalidation ensures that the ownership of the cacheline at X is transferred from old coreID at identified during the iteration to the new coreID A. Subsequently, an operation 408 determines if the BV is clear, if not, it continues the iterations.

The technology disclosed herein provides similar functionality as the other SFT solutions, while providing significantly lower space for tracking the agents using cachelines. Furthermore, the technology disclosed herein achieves this without excessive over snooping, which may be the case with other solutions. Specifically, one of the benefits of the adaptive coherency tracking disclosed herein is that it allows a flexible usage of the core valid (CV) vector bits to be able to tradeoff with sector size The storage capacity or the space saved by providing the adaptive coherency tracking in the manner disclosed herein allows using the freed-up space to provide further functionalities for SFT.

Figure 5:
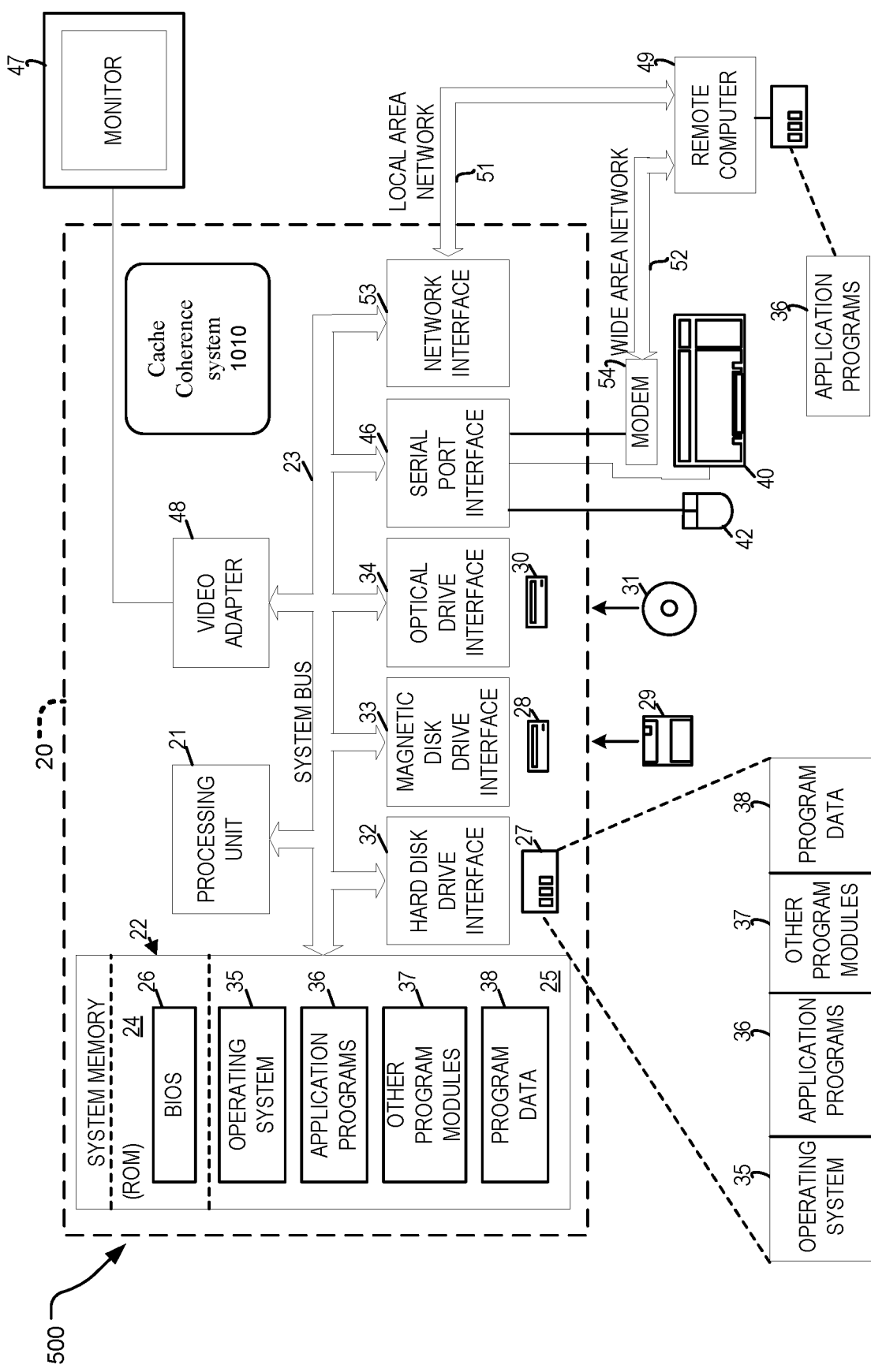
FIG. 5 illustrates an example system that may be useful in implementing the high latency query optimization system disclosed herein.

FIG. 5 illustrates an example system 500 that may be useful in implementing the high latency query optimization system disclosed herein. The example hardware and operating environment of FIG. 5 for implementing the described technology includes a computing device, such as a general-purpose computing device in the form of a computer 20, a mobile telephone, a personal data assistant (PDA), a tablet, smart watch, gaming remote, or other type of computing device. In the implementation of FIG. 5, for example, the computer 20 includes a processing unit 21, a system memory 22, and a system bus 23 that operatively couples various system components, including the system memory 22 to the processing unit 21. There may be only one or there may be more than one processing units 21, such that the processor of a computer 20 comprises a single central-processing unit (CPU), or a plurality of processing units, commonly referred to as a parallel processing environment. The computer 20 may be a conventional computer, a distributed computer, or any other type of computer; the implementations are not so limited.

The system bus 23 may be any of several types of bus structures, including a memory bus or memory controller, a peripheral bus, a switched fabric, point-to-point connections, and a local bus using any of a variety of bus architectures. The system memory 22 may also be referred to as simply the memory and includes read-only memory (ROM) 24 and random-access memory (RAM) 25. A basic input/output system (BIOS) 26, contains the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The computer 20 may be used to implement a high latency query optimization system disclosed herein. In one implementation, a frequency unwrapping module, including instructions to unwrap frequencies based at least in part on the sampled reflected modulations signals, may be stored in memory of the computer 20, such as the read-only memory (ROM) 24 and random-access memory (RAM) 25.

Furthermore, instructions stored on the memory of the computer 20 may be used to generate a transformation matrix using one or more operations disclosed in FIGS. 2-4. Similarly, instructions stored on the memory of the computer 20 may also be used to implement one or more operations of FIGS. 2-4. The memory of the computer 20 may also one or more instructions to implement the high latency query optimization system disclosed herein.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated tangible computer-readable media provide non-volatile storage of computer-readable instructions, data structures, program modules and other data for the computer 20. It should be appreciated by those skilled in the art that any type of tangible computer-readable media may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may generate reminders on the personal computer 20 through input devices such as a keyboard 40 and pointing device 42. Other input devices (not shown) may include a microphone (e.g., for voice input), a camera (e.g., for a natural user interface (NUI)), a joystick, a game pad, a satellite dish, a scanner, or the like. These and other input devices are often connected to the processing unit 21 through a serial port interface 46 that is coupled to the system bus 23, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the implementations are not limited to a particular type of communications device. The remote computer 49 may be another computer, a server, a router, a network PC, a client, a peer device, or other common network node, and typically includes many or all of the elements described above relative to the computer 20. The logical connections depicted in FIG. 5 include a local-area network (LAN) 51 and a wide-area network (WAN) 52. Such networking environments are commonplace in office networks, enterprise-wide computer networks, intranets, and the Internet, which are all types of networks.

When used in a LAN-networking environment, the computer 20 is connected to the local area network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are example and other means of communications devices for establishing a communications link between the computers may be used.

In an example implementation, software, or firmware instructions for the cache coherence system 510 may be stored in system memory 22 and/or storage devices 29 or 31 and processed by the processing unit 21. high latency query optimization system operations and data may be stored in system memory 22 and/or storage devices 29 or 31 as persistent data-stores.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some embodiments of high latency query optimization system may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner, or syntax, for instructing a computer to perform a certain function. The instructions may be implemented using any suitable high-level, low-level, object-oriented, visual, compiled and/or interpreted programming language.

The high latency query optimization system disclosed herein may include a variety of tangible computer-readable storage media and intangible computer-readable communication signals. Tangible computer-readable storage can be embodied by any available media that can be accessed by the high latency query optimization system disclosed herein and includes both volatile and nonvolatile storage media, removable and non-removable storage media. Tangible computer-readable storage media excludes intangible and transitory communications signals and includes volatile and nonvolatile, removable, and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the high latency query optimization system disclosed herein. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals moving through wired media such as a wired network or direct-wired connection, and signals moving through wireless media such as acoustic, RF, infrared and other wireless media.

Implementations disclosed herein provides a method including determining a cacheline sector associated with a snoop filter (SFT) having a plurality of SFT entries, determining a number of cachelines in the identified cacheline sector that are cached by one or more agents, and determining, based on the number of cachelines in the identified cacheline sector that are cached by one or more agents, a number of bits in a bit vector (BV) of one or more of the plurality of SFT entries, wherein the number of bits is required to track the one or more agents.

An alternative implementation provides a system including memory, one or more processor units, and a cache coherence system stored in the memory and executable by the one or more processor units, the cache coherence system encoding computer-executable instructions on the memory for executing on the one or more processor units a computer process, the computer process including determining a cacheline sector associated with a snoop filter (SFT) having a plurality of SFT entries, determining a number of cachelines in the identified cacheline sector that are cached by one or more agents, and determining, based on the number of cachelines in the identified cacheline sector that are cached by one or more agents, a number of bits in a bit vector (BV) of one or more of the plurality of SFT entries, wherein the number of bits is required to track the one or more agents.

An alternative implementation includes one or more physically manufactured computer-readable storage media, encoding computer-executable instructions for executing on a computer system a computer process, the computer process including determining a cacheline sector associated with a snoop filter (SFT) having a plurality of SFT entries, determining a number of cachelines in the identified cacheline sector that are cached by one or more agents, and determining, based on the number of cachelines in the identified cacheline sector that are cached by one or more agents, a number of bits in a bit vector (BV) of one or more of the plurality of SFT entries, wherein the number of bits are required to track the one or more agents.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of exemplary implementations.

What is claimed is:

1. A method, comprising:
   determining a cacheline sector associated with a snoop filter (SFT) having a plurality of SFT entries;
   determining a number of cachelines in the identified cacheline sector that are cached by one or more agents;
   determining, based on the number of cachelines in the identified cacheline sector that are cached by one or more agents, a number of bits in a bit vector (BV) of one or more of the plurality of SFT entries, wherein the number of bits is required to track the one or more agents; and
   determining a number of total agents N that may be tracked by the SFT based on size of the cacheline sector associated with the SFT.

2. The method of claim 1, further comprising determining the number of total agents N that may be tracked by the SFT based on: a total number of cores tracked by the SFT, size of cacheline, and the size of the cacheline sector associated with the SFT.

3. The method of claim 2, further comprising:
   comparing the number of total agents N that may be tracked by the SFT to a required number of agents to be tracked by the SFT; and
   in response to determining that the number of total agents N that may be tracked by the SFT is at or below the required number of agents to be tracked by the SFT, dynamically reducing the size of the cacheline sector associated with the SFT.

4. The method of claim 3, further comprising:
   in response to determining that the number of total agents N that may be tracked by the SFT is at above the required number of agents to be tracked by the SFT, dynamically increasing the size of the cacheline sector associated with the SFT.

5. One or more physically manufactured tangible computer-readable storage media, encoding computer-executable instructions for executing on a computer system a computer process, the computer process comprising:
   determining a cacheline sector associated with a snoop filter (SFT) having a plurality of SFT entries;
   determining a number of cachelines in the identified cacheline sector that are cached by one or more agents;
   determining, based on the number of cachelines in the identified cacheline sector that are cached by one or more agents, a number of bits in a bit vector (BV) of one or more of the plurality of SFT entries, wherein the number of bits are required to track the one or more agents; and
   determining a number of total agents N that may be tracked by the SFT based on size of the cacheline sector associated with the SFT.

6. The one or more physically manufactured tangible computer-readable storage media of manufacture of claim 5, wherein the computer process further comprising determining a number of total agents N that may be tracked by the SFT based on: a total number of cores tracked by the SFT, size of cacheline, and the size of the cacheline sector associated with the SFT.

7. The one or more physically manufactured tangible computer-readable storage media of claim 6, wherein the computer process further comprising:
   comparing the number of total agents N that may be tracked by the SFT to a required number of agents to be tracked by the SFT; and
   in response to determining that the number of total agents N that may be tracked by the SFT is at or below the required number of agents to be tracked by the SFT, dynamically reducing the size of the cacheline sector associated with the SFT.

8. The one or more physically manufactured tangible computer-readable storage media of claim 6, wherein the computer process further comprising:
   in response to determining that the number of total agents N that may be tracked by the SFT is at above the required number of agents to be tracked by the SFT, dynamically increasing the size of the cacheline sector associated with the SFT.

9. A system comprising:
   memory;
   one or more processor units; and
   a cache coherence system stored in the memory and executable by the one or more processor units, the cache coherence system encoding computer-executable instructions on the memory for executing on the one or more processor units a computer process, the computer process comprising:
   determining a cacheline sector associated with a snoop filter (SFT) having a plurality of SFT entries;
   determining a number of cachelines in the identified cacheline sector that are cached by one or more agents;

determining, based on the number of cachelines in the identified cacheline sector that are cached by one or more agents, a number of bits in a bit vector (BV) of one or more of the plurality of SFT entries, wherein the number of bits is required to track the one or more agents; and determining a number of total agents N that may be tracked by the SFT based on size of the cacheline sector associated with the SFT.

10. The system of claim 9, wherein the computer process further comprising determining a number of total agents N that may be tracked by the SFT based on: a total number of cores tracked by the SFT, size of cacheline, and the size of the cacheline sector associated with the SFT.

11. The system of claim 10, wherein the computer process further comprising:

comparing the number of total agents N that may be tracked by the SFT to a required number of agents to be tracked by the SFT; and in response to determining that the number of total agents N that may be tracked by the SFT is at or below the required number of agents to be tracked by the SFT, dynamically reducing the size of the cacheline sector associated with the SFT.

12. The system of claim 10, wherein the computer process further comprising:

in response to determining that the number of total agents N that may be tracked by the SFT is at above the required number of agents to be tracked by the SFT, dynamically increasing the size of the cacheline sector associated with the SFT.

* * * * *